(12) United States Patent
Xu

(10) Patent No.: US 7,685,832 B2
(45) Date of Patent: Mar. 30, 2010

(54) ENERGY PICKING-UP SYSTEM BY USING WATER OF RIVER, LAKE, AND SEA AS LOW-GRADE ENERGY SOURCE

(76) Inventor: Shengheng Xu, Beijing Ever Source Sci. & Tech. Development Co., Ltd., No. 102, Xingshikou Road, Haidian District, Beijing (CN) 100093

( * ) Notice: Subject to any disclaimer, the term of this patent is extended or adjusted under 35 U.S.C. 154(b) by 367 days.

(21) Appl. No.: 11/573,341

(22) PCT Filed: Oct. 19, 2004

(86) PCT No.: PCT/CN2004/001185

§ 371 (c)(1),
(2), (4) Date: Feb. 6, 2007

(87) PCT Pub. No.: WO2006/034609

PCT Pub. Date: Apr. 6, 2006

(65) Prior Publication Data

US 2007/0169481 A1     Jul. 26, 2007

(30) Foreign Application Priority Data

Sep. 30, 2004    (CN) ...................... 2004 1 00805242

(51) Int. Cl.
*F25D 23/12* (2006.01)
(52) U.S. Cl. ....................... 62/260; 62/324.1
(58) Field of Classification Search ............... 62/260, 62/324.1; 60/650, 641.2; 165/45
See application file for complete search history.

(56) References Cited

U.S. PATENT DOCUMENTS 6,772,605 B2 *  8/2004  Xu ............................ 62/260
7,082,779 B2 *  8/2006  Xu et al. ...................... 62/260

FOREIGN PATENT DOCUMENTS

| CN | 2438968 Y | 7/2001 |
|---|---|---|
| CN | 1339678 A | 3/2002 |
| CN | 1346039 A | 4/2002 |
| CN | 2490481 Y | 5/2002 |
| DE | 270258 A | 7/1978 |
| DE | 3015254 A | 10/1981 |
| JP | 59183880 A | 10/1984 |

* cited by examiner

*Primary Examiner*—Melvin Jones
(74) *Attorney, Agent, or Firm*—Workman Nydegger

(57) ABSTRACT

An energy picking-up system by using water of river, lake and sea as low-grade energy source, includes energy collecting device, energy exalting device and radiator in series. The energy collecting device includes a circuit, which is comprised of a heat collector, a low-grade heat exchanger and a diving pump. The heat collector includes a siphon tube, a drain tube and a vacuum equipment. One end of the siphon tube is placed in the heat collecting well that is located near river, lake or sea, and the other end is placed into the water of river, lake or sea. The vacuum equipment is connected with the siphon tube. One end of the drain tube is connected with the outlet of the low-grade heat exchanger, the other end is placed into or onto the water of river, lake or sea. The diving pump is positioned in the heat collecting well, and is connected with the inlet of the low-grade heat exchanger coin. The energy picking-up system has a simple structure, which is easy to install and maintain, and can work normally in any cases.

10 Claims, 3 Drawing Sheets

ENERGY PICKING-UP SYSTEM BY USING WATER OF RIVER, LAKE, AND SEA AS LOW-GRADE ENERGY SOURCE

TECHNICAL FIELD OF THE INVENTION

The present invention relates to an energy picking-up system by using water of river, lake or sea as low-grade energy source, in particular to an energy picking-up system for picking up a low-grade energy from water of river, lake or sea as low-grade energy source in an area near the river, lake or sea and transforming the low-grade energy into a high-grade energy by means of an energy exalting device, so as to achieve quad supply such as heating in winter, cooling in summer, daily supply of domestic hot water and cold source.

BACKGROUND OF THE INVENTION

In the inventor's prior Chinese patent ZL00123491.9, a liquid cold/hot source system by using water of river, lake or sea as an energy source was disclosed. The system is such a liquid cold/hot source system, which uses water of river, lake or sea as energy source, is free of pollution, occupies relatively small area, and can supply domestic hot water. However, a heat collecting device of this system should be positioned below the fluid surface of river, lake or sea. Since water of river, lake or sea keeps flowing and often arises large or even drastic fluctuation, it is much inconvenient to install and maintain the heat collecting device. In addition, the heat collecting device can not operate normally due to the fluctuation of water of river, lake or sea, and especially in winter, the frozen water of river, lake or sea will directly influence the normal operation of the system.

SUMMARY OF THE INVENTION

In order to overcome the drawbacks in the prior art, the present invention proposes an energy picking-up system by using water of river, lake or sea as low-grade energy source, which can safely and efficiently use heat energy in river, lake or sea so as to accomplish heating in winter and cooling in summer.

An energy picking-up system by using water of river, lake or sea as low-grade energy source according to the present invention, comprises an energy collecting device, an energy exalting device and a radiator connected in series, wherein the energy collecting device comprises a circuit composed of a heat collector disposed in a heat collecting well, a low-grade-energy-side heat exchange coil pipe, and a diving pump disposed in the heat collecting well and having an port connected with a fluid intake port of the low-grade-energy-side heat exchange coil pipe, wherein the heat collector comprises a siphon pipe having one port disposed in the heat collecting well near the river, lake or sea and the other port disposed in a river, lake or sea, a drain pipe having one port connected with a fluid discharge port of the low-grade-energy-side heat exchange coil pipe and the other port disposed in or on the river, lake or sea, and a vacuum equipment connected with the siphon pipe.

In the energy picking-up system by using water of river, lake or sea as low-grade energy source according to the present invention, the siphon pipe is composed of two vertical pipes and one horizontal pipe, wherein one vertical pipe is disposed in the heat collecting well and provided with a check valve therein, the other vertical pipe is disposed in the river, lake or sea, and the horizontal pipe is connected with the vacuum equipment comprising a vacuum pump, a one-way valve, and an air release valve, wherein the air release valve is connected with the siphon pipe via a conduit connected with the one-way valve and the vacuum pump.

In the energy picking-up system by using water of river, lake or sea as low-grade energy source according to the present invention, the siphon pipe is nested in the drain pipe.

The energy picking-up system by using water of river, lake or sea as low-grade energy source according to the present invention, a first heat exchanger is provided between the energy collecting device and the energy exalting device and comprises a circuit which is comprised of an energy input coil pipe, a eleventh valve, an energy output coil pipe, a fluid return pump and a fifth valve which are connected in series, the energy input coil pipe of the first heat exchanger is coupled with the low-grade-energy-side heat exchange coil pipe; a second heat exchanger is provided between the radiator and the energy exalting device and comprises a circuit which is comprised of a high-grade-energy-side heat exchange coil pipe, a fluid discharge pump, an eighth valve, an energy output coil pipe and a fourth valve which are connected in series, the energy output coil pipe is coupled with an energy input coil pipe of the radiator; a seventh valve is connected in parallel between a fluid intake port of the energy input coil pipe of the first heat exchanger and a joint point of the fluid discharge pump and the eighth valve; a twelfth valve is connected in parallel between a fluid discharge port of the energy output coil pipe of the second heat exchanger and a fluid discharge port of the energy output coil pipe of the first heat exchanger; a third valve is connected in parallel between a fluid intake port of the high-grade-energy-side heat exchange coil pipe and a fluid discharge port of the energy input coil pipe of the first heat exchanger; the energy exalting device is composed of a first level heat pump and a second level heat pump connected in series, wherein the first level heat pump comprises a circuit which is comprised of a first evaporator, a thirteenth valve, a first compressor, a first condenser, a first expansion valve and a fourteenth valve connected in series, and the second level heat pump comprises a circuit which is comprised of a second evaporator, a fifteenth valve, a second compressor, a second condenser, a second expansion valve and a sixteenth valve connected in series; a first valve is connected in parallel between an output port of the first evaporator and a joint point of the fifteenth valve and the second compressor; a second valve is connected in parallel between an input port of the first evaporator and a joint point of the sixteenth valve and the second expansion valve; the first evaporator is coupled with the energy output coil pipe of the first heat exchanger, and the second condenser is coupled with the high-grade-energy-side heat exchange coil pipe.

In the energy picking-up system by using water of river, lake or sea as low-grade energy source according to the present invention, a heating pipe of a water heater is connected in series between the second compressor and the second condenser.

In the energy picking-up system by using water of river, lake or sea as low-grade energy source according to the present invention, a heat exchange coil pipe of a cold storage and a ninth valve connected with each other in series are connected in parallel between the fluid return pump and the fifth valve, wherein the heat exchange coil pipe of the cold storage has a fluid intake port connected with a fluid discharge port of the fluid return pump and a fluid discharge port connected with a fluid intake port of the energy output coil pipe of the second heat exchanger via the ninth valve and the sixth valve; a tenth valve is connected in parallel between the fluid intake port of the heat exchange coil pipe of the cold storage and a fluid discharge port of the ninth valve; a conduit between the fifth valve and the tenth valve and a conduit between the ninth valve and the sixth valve are connected together by a four-way pipe joint.

In comparison with the liquid cold/hot source system by using water of river, lake or sea as an energy source in the prior art, the energy picking-up system by using water of river, lake or sea as low-grade energy source according to the present invention has the following advantages.

1) The energy picking-up system has a simple structure, is easy to be installed and maintained, is low in production cost, and can work normally in any case.

2) The deployment of two heat exchangers makes it possible to completely separate the anti-freezing fluid and the water in case of both cooling and heating, so as to ensure that the system works normally.

3) Under both operation states of cooling and heating, the cold storage can obtain a stable cold source, and when the heat pump operates, the water heater arranged at the back of the compressor can always obtain a sensible heat which is stable and has high temperature so as to supply stable domestic hot water.

DETAILED DESCRIPTION OF THE INVENTION

Figure 1:
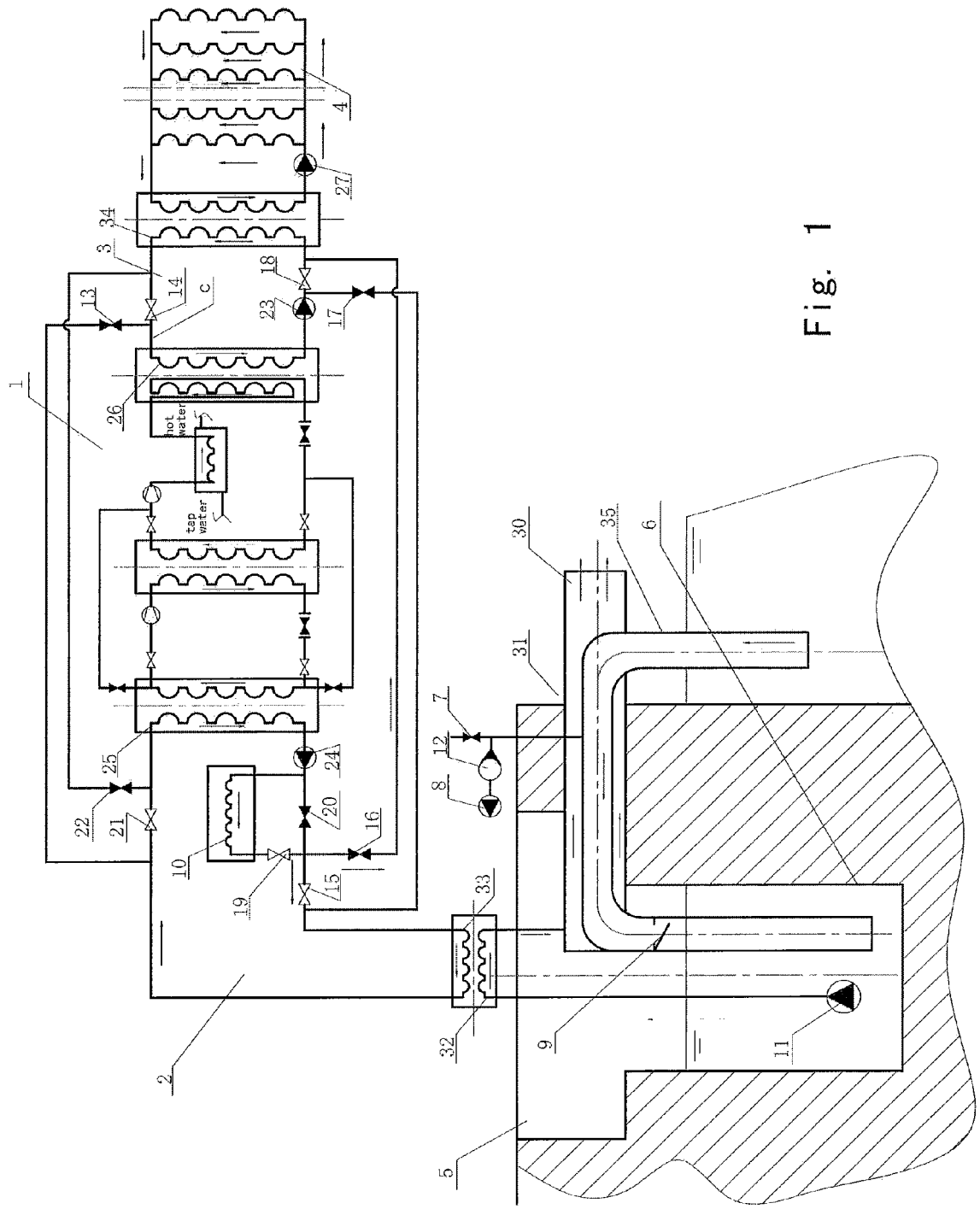
FIG. 1 is a view illustrating an energy picking-up system by using water of river, lake or sea as low-grade energy source according to the present invention, which operates in the state of heating in winter.
Figure 2:
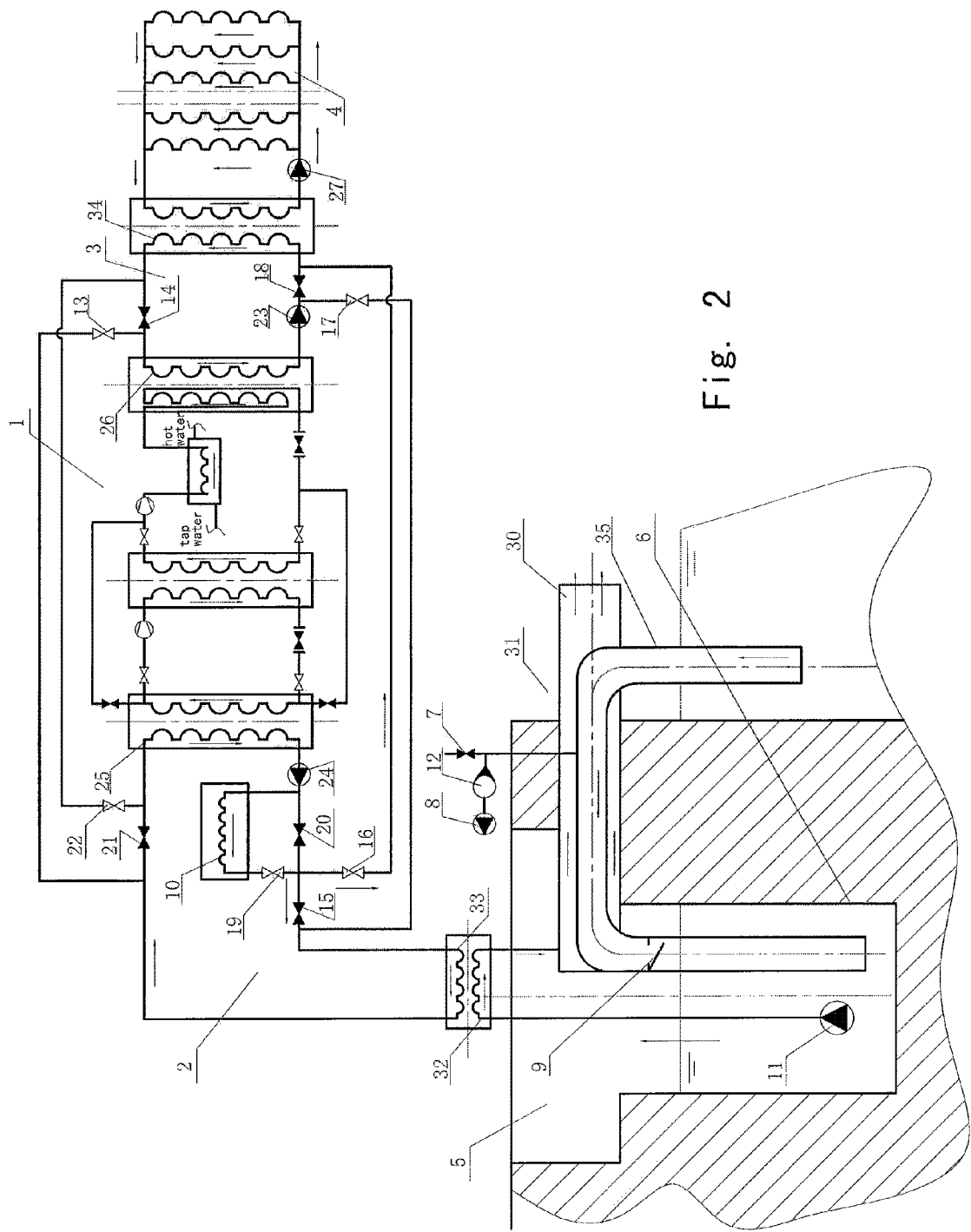
FIG. 2 is a view illustrating the energy picking-up system by using water of river, lake or sea as low-grade energy source according to the present invention, which operates in the state of cooling in summer.

As shown in FIGS. 1 and 2, the connection relationships among the elements are identical in both figures and the difference between these two figures lies in the on/off state of each valve in two operating status, For the sake of clarity in the figures, a valve applied without black color indicates the valve is in an "opening" state and a valve applied with black color indicates the valve is in a "closing" state.

Referring to FIGS. 1 and 2, an energy picking-up system by using water of river, lake or sea as low-grade energy source according to the present invention comprises an energy collecting device 5, an energy exalting device 1 and a radiator 4. The energy collecting device 5 is coupled with a first evaporator 133 of a first level heat pump 28 of the energy exalting device 1 via an energy output coil pipe 25 of a first heat exchanger 2 (see FIG. 3). An energy input coil pipe of the radiator 4 is coupled with an energy output coil pipe 34 of a second heat exchanger 3. The energy collecting device 5 is a device for collecting low-grade energy, and comprises a heat collector 31 disposed in a heat collecting well 6, a low-grade-energy-side heat exchange coil pipe 32 and a diving pump 11. The heat collector 31 comprises a siphon pipe 35, a drain pipe 30 and a vacuum equipment. The siphon pipe 35 is composed of two vertical pipes and one horizontal pipe, wherein one vertical pipe is disposed in the heat collecting well 6 and provided with a check valve 9 therein; the other vertical pipe is disposed in a river, lake or sea; and the horizontal pipe is connected with the vacuum equipment. The vacuum equipment comprises a vacuum pump 8, a one-way valve 12 and an air release valve 7. The air release valve 7 is connected to the siphon pipe 35 via a conduit which is connected to the one-way valve 12 and the vacuum pump 8. The drain pipe 30 is nested around the siphon pipe 35. One port of the drain pipe 30 is connected with a fluid discharge port of the low-grade-energy-side heat exchange coil pipe 32, and the other port of the drain pipe 30 is placed in or on water of the river, lake or sea. The diving pump 11 is positioned in the heat collecting well 6, and has a port connected with a fluid intake port of the low-grade-energy-side heat exchange coil pipe 32.

The first heat exchanger 2 comprises a circuit, which is comprised of an energy input coil pipe 33, a eleventh valve 21, the energy output coil pipe 25, a fluid return pump 24, a tenth valve 20 and a fifth valve 15 connected in series. The circuit is filled with a heat exchange medium. A heat exchange coil pipe 10 of a cold storage and a ninth valve 19, which are connected with each other in series, are connected in parallel between the fluid return pump 24 and the fifth valve 15. A fluid intake port of the heat exchange coil pipe 10 of the cold storage is connected with a fluid discharge port of the fluid return pump 24. A fluid discharge port of the heat exchange coil pipe 10 of the cold storage is connected with a fluid intake port of the energy output coil pipe 34 of the second heat exchanger 3 via the ninth valve 19 and a sixth valve 16. A conduit between the fifth valve 15 and the tenth valve 20 and a conduit between the ninth valve 19 and the sixth valve 16 are connected together by a four-way pipe joint. The energy input coil pipe 33 of the first heat exchanger 2 is coupled with the low-grade-energy-side heat exchange coil pipe 32.

The second heat exchanger 3 comprises a circuit, which is comprised of a high-grade-energy-side heat exchange coil pipe 26, a fluid discharge pump 23, an eighth valve 18, the energy output coil pipe 34 and a fourth valve 14 connected in series. The circuit is filled with a heat exchange medium. The high-grade-energy-side heat exchange coil pipe 26 is coupled with a second condenser 117 of a second level heat pump 29 of the energy exalting device 1. A seventh valve 17 is connected in parallel between a fluid intake port of the energy input coil pipe 33 of the first heat exchanger 2 and a joint point of the fluid discharge pump 23 and the eighth valve 18. A twelfth valve 22 is connected in parallel between a fluid discharge port of the energy output coil pipe 34 of the second heat exchanger 3 and a fluid intake port of the energy output coil 25 of the first heat exchanger 2. A third valve 13 is connected in parallel between a fluid intake port of the high-grade-energy-side heat exchange coil pipe 26 and a fluid discharge port of the energy input coil pipe 33 of the first heat exchanger 2.

Figure 3:
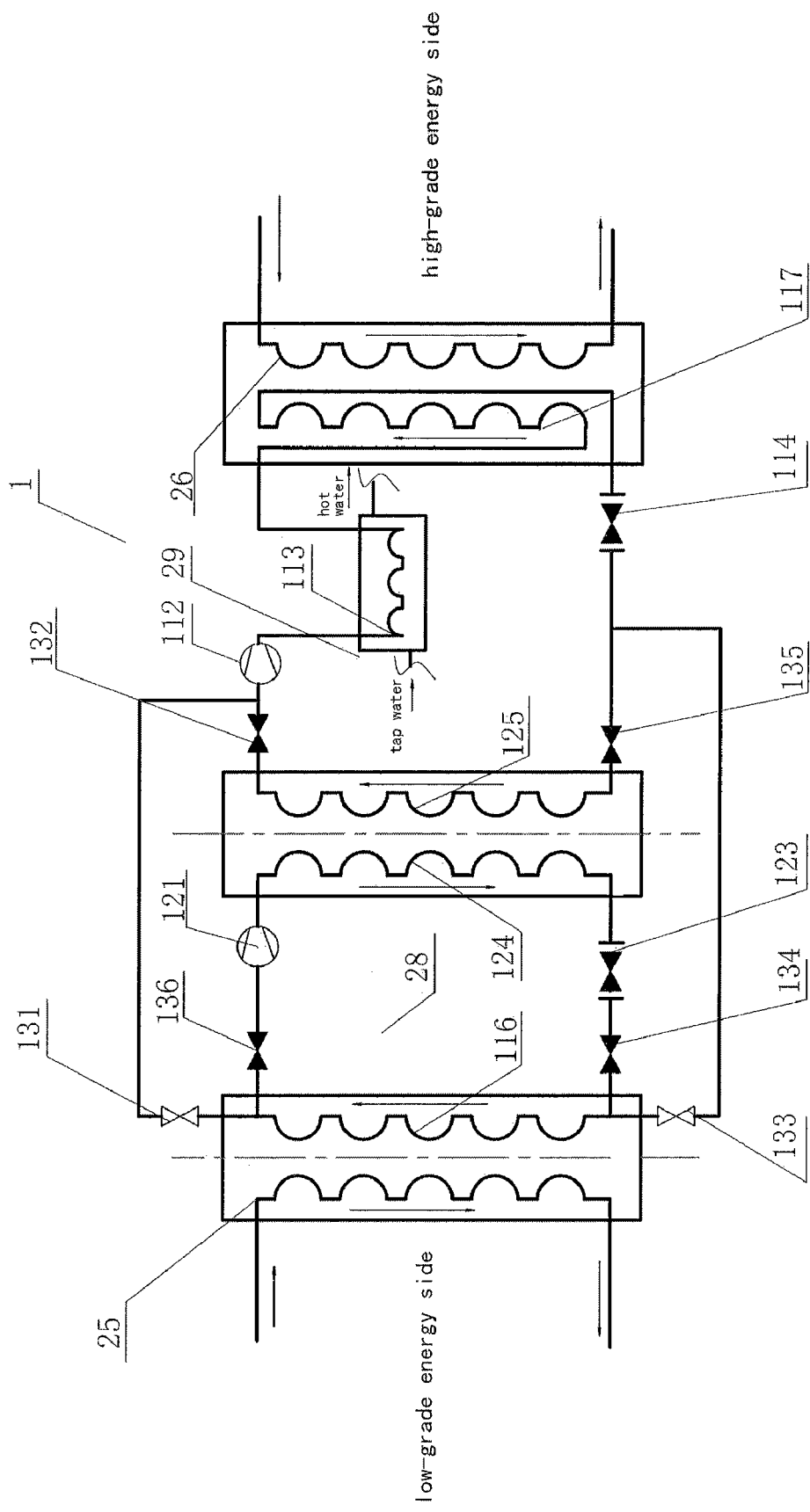
FIG. 3 is an enlarged view of the heat pump in FIGS. 1 and 2, which illustrates the state that only the first level heat pump is activated.

Referring to FIG. 3, the energy exalting device 1 is composed by the first level heat pump 28 and the second level heat pump 29 connected with each other in series. Herein, the first level heat pump 28 comprises a circuit, which is comprised of a first evaporator 116, a thirteenth valve 136, a first compressor 121, a first condenser 124, a first expansion valve 123 and a fourteenth valve 134 connected in series. The second level heat pump 29 comprises a circuit, which is comprised of a second evaporator 125, a fifteenth valve 132, a second compressor 112, a heating pipe 113 of a water heater, a second condenser 117, a second expansion valve 114 and a sixteenth valve 135 connected in series. A first valve 131 is connected in parallel between an output port of the first evaporator 116 and a joint point of the fifteenth valve 132 and the second compressor 112. A second valve 133 is connected in parallel between an input port of the first evaporator 116 and a joint point of the sixteenth valve 135 and the second expansion valve 114. The first evaporator 116 is coupled with the energy output coil pipe 25 of the first heat exchanger 2, and the second condenser 117 is coupled with the high-grade-energy-side heat exchange coil pipe 26 of the second heat exchanger 3.

The operation process of the energy exalting device 1 will be described as follows.

In winter, when the energy source to be exploited is over 5° C., the first valve 131 and the second valve 133 are opened, and the fifteenth valve 132, the fourteenth valve 134, the sixteenth valve 135 and the thirteenth valve 136 are closed (as shown in FIG. 3). Now, a circuit is formed by the first evaporator 116, the first valve 131, the second compressor 112, the heating pipe 113 of the water heater, the second condenser 117, the second expansion valve 114, and the second valve 133 of the energy exalting device 1. A working medium in the first evaporator 116 absorbs the low-grade energy flowing through the energy output coil pipe 25 of the first heat exchanger 2 and is evaporated into gas; the gas flows through the first valve 131 into the second compressor 112 so as to be compressed and rise in temperature, and then flows through the heating pipe 113 of the water heater so as to heat the domestic water for user's washing. Afterwards, the gas flows through the second condenser 117, and releases the heat energy to the high-grade-energy-side heat exchange coil pipe 26 of the second heat exchanger 3 which is coupled with the second condenser 117. Since the energy output coil pipe 34 of the heat exchanger 3 is coupled with an energy input coil pipe of the radiator 4, the heat energy is finally transferred to users for the purpose of heating. Subsequently, the condensed working medium in liquid state is decompressed by the second expansion valve 114, and then flows through the second valve 133 into the first evaporator 116 again to absorb heat energy. This process is repeatedly circulated.

When the energy source to be exploited is below 5° C., the first level heat pump 28 can not work normally. That is to say, when the energy which is exalted by the energy exalting device 1 is not enough for heating, the first level heat pump 28 and the second level heat pump 29 will operate together. Herein, the first valve 131 and the second valve 133 are closed, and the fifteenth valve 132, the fourteenth valve 134, the sixteenth valve 135 and the thirteenth valve 136 are opened (as shown in FIGS. 1 and 2). The first compressor 121 and the second compressor 112 are activated simultaneously so that two circuits are simultaneously operated. That is, when the liquid below 5° C. flows through the energy output coil pipe 25 of the first heat exchanger 2, the working medium in the first evaporator 116 absorbs the low-grade energy flowing through the energy output coil pipe 25 of the first heat exchanger 2 and is evaporated into gas. The gas is compressed by the first compressor 121 and thus rises in temperature (to about 15° C.), and then flows into the first condenser 124. Since the first condenser 124 is coupled with the second evaporator 125, the working medium in the first condenser 124 condenses and releases heat energy to a working medium in the second evaporator 125, and the working medium in the second evaporator 125 absorbs the heat energy and thus is evaporated into gas. Then, the gas flows through the second compressor 112 so as to be compressed and rise in temperature, and then flows through the heating pipe 113 of the water heater to heat the domestic water for user's washing. Afterwards, the gas flows through the second condenser 117 so as to be condensed (to about 50° C.) and thus release heat energy to the working medium in the high-grade-energy-side heat exchange coil pipe 26 which is coupled with the second condenser 117. Then, the heat energy is transferred to the user via the energy output coil pipe 34 of the heat exchanger 3 for the purpose of heating. The working medium in the first condenser 124 is decompressed by the first expansion valve 123 after releasing the heat energy thereof in the condenser 124, and then flows into the first evaporator 116 to be evaporated by absorbing heat energy. The working medium in the second condenser 117 is decompressed by the second expansion valve 114 after releasing the heat energy thereof in the second condenser 117, and then flows into the second evaporator 125 to be evaporated by absorbing heat energy. This process is repeatedly circulated.

When cooling is required in summer, the energy output coil pipe 34 of the second heat exchanger 3 is connected with the energy output coil pipe 25 of the first heat exchanger 2, and at the same time, the high-grade-energy-side heat exchange coil pipe 26, which is coupled with the second condenser 117, is connected with the energy input coil pipe 33 of the first heat exchanger 2. By means of the operations of the first level heat pump 28 or the second level heat pump 29, the cold energy, whose temperature has been reduced, is transferred to the energy output coil pipe 25 of the first heat exchanger 2, and then is transferred to the user via the energy output coil pipe 34 of the second heat exchanger 3 for the purpose of cooling.

As can be seen from the above operation process, the energy exalting device 1 is a heat pump which can change the operating modes in accordance with the variation of the environment temperature. The energy exalting device 1 can provide a heat source for heating in different temperature as required, which is adaptable and flexible, and has a wide range of applications. The compressors in the two circuits of the energy exalting device 1 can be identical or different, which can be determined in the optimum configuration as required.

The operation principle of the energy picking-up system by using water of river, lake or sea as low-grade energy source is as follows.

(1) The operation process of the energy collecting device 5 will be described.

The vacuum pump 8 is activated so that the air in the siphon pipe 35 is discharged continuously; the check valve 9 is in a close state, and the water flows into the siphon pipe 35 continuously. When the water reaches the check valve 9, the check valve 9 is opened, so that the water flows through the check valve 9 into the heat collecting well 6, and the siphon process does not stop until the water level in the heat collecting well 6 is the same as that in the river, lake or sea. The vacuum pump 8 is turned off when the water flows through the check valve 9.

The diving pump 11 is activated, so that the water in the heat collecting well 6 is pumped into the energy input coil pipe 32 of the energy collecting device 5. After releasing heat energy in the energy input coil pipe 32, the water flows into the river, lake or sea via the drain pipe 30, which is concentric with a portion of the siphon pipe 35. When the diving pump 11 pumps the water from the heat collecting well 6, the heat collecting well 6 will be continuously complemented by the water from the river, lake or sea, so that the water in the heat collecting well 6 is always fresh; while the water, which have completely released heat energy in the energy input coil pipe 32, is discharged.

When the heat collecting well 6 needs maintenance, the air release valve 7 is opened so that the siphon phenomenon is terminated, and the diving pump 11 is activated so as to drain the water in the heat collecting well 6 completely.

(2) The operation process of the energy picking-up system by using water of river, lake or sea as low-grade energy source according to the present invention during heating in winter will be described.

FIG. 1 is a view illustrating the energy picking-up system by using water of river, lake or sea as low-grade energy source according to the present invention, which operates in the state of heating in winter. Under the state shown in FIG. 1, valves 15, 21, 18, 14 and 19 are opened, while valves 20, 22, 13, 16 and 17 are closed.

The liquid return pump 24 is activated, the heat exchange medium in the energy output coil pipe 25 of the first heat exchanger 2, whose temperature has been reduced, is transferred to the heat exchange coil pipe 10 of the cold storage by the return pump 24. Then the heat exchange medium flows through the ninth valve 19 and the fifth valve 15 into the energy input coil pipe 33 of the first heat exchanger 2, so as to absorb the heat energy released by the low-grade-energy-side heat exchange coil pipe 32 which is coupled with the energy input coil pipe 33. The above process is repeated. The heat energy which is obtained by the energy output coil pipe 25 of the first heat exchanger 2, exalts the low-grade heat energy into the high-grade heat energy in the second condenser 117 by means of the energy exalting device 1. Since the second condenser 117 is coupled with the high-grade-energy-side heat exchange coil pipe 26 of the second heat exchanger 3, the fluid discharge pump 23 transfers the anti-freezing fluid, which has obtained heat energy from the high-grade-energy-side heat exchange coil pipe 26, into the energy output coil pipe 34 of the second heat exchanger 3 via the eighteenth valve 18 so as to release the heat energy. The above process is repeatedly circulated, so that the heat energy is continuously transferred to the energy output coil pipe 34 of the second heat exchanger 3. The water, which has obtained heat energy from the energy output coil pipe 34 of the second heat exchanger 3, is transferred into the radiator 4 by a circulating pump 27 and releases heat energy so as to ensure the normal operation of the radiator 4, for the purpose of heating. Meanwhile, the heat exchange coil pipe 10 of the cold storage obtains enough cold energy to be used for the cold storage.

(3) The operation process of the energy picking-up system by using water of river, lake or sea as low-grade energy source according to the present invention during cooling in summer will be described.

FIG. 2 is a view illustrating the energy picking-up system by using water of river, lake or sea as low-grade energy source, which operates in the state of cooling in summer. Under the state shown in FIG. 2, valves 22, 13, 17, 19 and 16 are opened, while valves 21, 14, 15, 18 and 20 are closed.

With the aid of the fluid discharge pump 23, the heat exchange medium in the energy input coil pipe 33 of the first heat exchanger 2 flows through the third valve 13 into the high-grade-energy-side heat exchange coil pipe 26 of the second heat exchanger 3. After releasing the cold energy and increasing in temperature, the heat exchange medium flows through the fluid discharge pump 23 and the seventh valve 17 and returns into the energy input coil pipe 33 of the first heat exchanger 2. Then, the energy exalting device 1 is activated. With the aid of the energy exalting device 1, the heat exchange medium in the first evaporator 116 of the energy exalting device 1 is evaporated so as to absorb the heat energy. Since the first evaporator 116 is coupled with the energy output coil pipe 25 of the first heat exchanger 2, the first evaporator 116 releases cold energy to the energy output coil pipe 25 of the first heat exchanger 2. The anti-freezing fluid in the energy output coil pipe 25 of the first heat exchanger 2, whose temperature has been reduced, is transferred into the heat exchange coil pipe 10 of the cold storage by the fluid return pump 24, and flows through the valves 19 and 16 into the energy output coil pipe 34 of the second heat exchanger 3 to release cold energy. The energy input coil pipe of the radiator 4 continuously absorbs cold energy from the energy output coil pipe 34 of the second heat exchanger 3, and the cold energy is transferred by the circulating pump 27 to the user for the purpose of cooling. The anti-freezing fluid, which has been increased in temperature, flows out from the energy output coil pipe 34 of the second heat exchanger 3, and flows into the energy output coil pipe 25 of the first heat exchanger 2 via the twelfth valve 22. The above process is repeatedly circulated so as to achieve the purpose of cooling.

INDUSTRIAL APPLICATION

The energy picking-up system by using water of river, lake or sea as low-grade energy source according to the present invention, can be widely applied to provide heating in winter, cooling in summer, daily supply of domestic hot water, and supply of stable cold source for cold storage for the residents, enterprise units and public service units in an area near the river, lake or sea by using the low-grade energy of river, lake or sea.

What is claimed is:

1. An energy picking-up system by using water of river, lake or sea as low-grade energy source, comprising:
   an energy collecting device, an energy exalting device and a radiator connected in series, wherein:
   the energy collecting device comprises a circuit having a heat collector disposed in a heat collecting well, a low-grade-energy-side heat exchange coil pipe, and a diving pump disposed in the heat collecting well and having one port connected with a fluid intake port of the low-grade-energy-side heat exchange coil pipe; and
   the heat collector comprises a siphon pipe having one port disposed in the heat collecting well near a river, lake or sea and another port disposed in the river, lake or sea, a drain pipe having one port connected with a fluid discharge port of the low-grade-energy-side heat exchange coil pipe and another port disposed in or on the river, lake or sea, and a vacuum equipment connected with the siphon pipe.

2. The energy picking-up system by using water of river, lake or sea as low-grade energy source of claim 1, wherein:
   the siphon pipe comprises two vertical pipes and one horizontal pipe, one vertical pipe is disposed in the heat collecting well and provided with a check valve therein, another vertical pipe is disposed in the river, lake or sea, and the horizontal pipe is connected with the vacuum equipment comprising a vacuum pump, a one-way valve, and an air release valve, wherein the air release valve is connected with the siphon pipe via a conduit connected with the one-way valve and the vacuum pump.

3. The energy picking-up system by using water of river, lake or sea as low-grade energy source of claim 1, wherein the siphon pipe is nested in the drain pipe.

4. The energy picking-up system by using water of river, lake or sea as low-grade energy source of claim 3, wherein:
   a first heat exchanger is provided between the energy collecting device and the energy exalting device and comprises a circuit having an energy input coil pipe, a eleventh valve, an energy output coil pipe, a fluid return pump and a fifth valve which are connected in series, the energy input coil pipe of the first heat exchanger is coupled with the low-grade-energy-side heat exchange coil pipe;
   a second heat exchanger is provided between the radiator and the energy exalting device and comprises a circuit comprised of a high-grade-energy-side heat exchange coil pipe, a fluid discharge pump, an eighth valve, an energy output coil pipe and a fourth valve which are connected in series, the energy output coil pipe is coupled with an energy input coil pipe of the radiator;

a seventh valve is connected in parallel between a fluid intake port of the energy input coil pipe of the first heat exchanger and a joint point of the fluid discharge pump and the eighth valve;

a twelfth valve is connected in parallel between a fluid discharge port of the energy output coil pipe of the second heat exchanger and a fluid discharge port of the energy output coil pipe of the first heat exchanger;

a third valve is connected in parallel between a fluid intake port of the high-grade-energy-side heat exchange coil pipe and a fluid discharge port of the energy input coil pipe of the first heat exchanger;

the energy exalting device is composed of a first level heat pump and a second level heat pump connected with each other in series, wherein the first level heat pump comprises a circuit comprised of a first evaporator, a thirteenth valve, a first compressor, a first condenser, a first expansion valve and a fourteenth valve connected in series, and the second level heat pump comprises a circuit composed of a second evaporator, a fifteenth valve, a second compressor, a second condenser, a second expansion valve and a sixteenth valve connected in series;

a first valve is connected in parallel between an output port of the first evaporator and a joint point of the fifteenth valve and the second compressor;

a second valve is connected in parallel between an input port of the first evaporator and a joint point of the sixteenth valve and the second expansion valve; and the first evaporator is coupled with the energy output coil pipe of the first heat exchanger, and the second condenser is coupled with the high-grade-energy-side heat exchange coil pipe.

5. The energy picking-up system by using water of river, lake or sea as low-grade energy source of claim 4, wherein a heating pipe of a water heater is connected in series between the second compressor and the second condenser.

6. The energy picking-up system by using water of river, lake or sea as low-grade energy source of claim 5, wherein:

a heat exchange coil pipe of a cold storage and a ninth valve connected with each other in series are connected in parallel between the fluid return pump and the fifth valve, wherein the heat exchange coil pipe of the cold storage has a fluid intake port connected with a fluid discharge port of the fluid return pump and a fluid discharge port connected with a fluid intake port of the energy output coil pipe of the second heat exchanger via the ninth valve and the sixth valve; a tenth valve is connected in parallel between the fluid intake port of the heat exchange coil pipe of the cold storage and a fluid discharge port of the ninth valve;

a conduit between the fifth valve and the tenth valve and a conduit between the ninth valve and the sixth valve are connected together by a four-way pipe joint.

7. The energy picking-up system by using water of river, lake or sea as low-grade energy source of claim 2, wherein the siphon pipe is nested in the drain pipe.

8. The energy picking-up system by using water of river, lake or sea as low-grade energy source of claim 7, wherein:

a first heat exchanger is provided between the energy collecting device and the energy exalting device and comprises a circuit composed of an energy input coil pipe, a eleventh valve, an energy output coil pipe, a fluid return pump and a fifth valve which are connected in series, the energy input coil pipe of the first heat exchanger is coupled with the low-grade-energy-side heat exchange coil pipe;

a second heat exchanger is provided between the radiator and the energy exalting device and comprises a circuit comprised of a high-grade-energy-side heat exchange coil pipe, a fluid discharge pump, an eighth valve, an energy output coil pipe and a fourth valve which are connected in series, the energy output coil pipe is coupled with an energy input coil pipe of the radiator;

a seventh valve is connected in parallel between a fluid intake port of the energy input coil pipe of the first heat exchanger and a joint point of the fluid discharge pump and the eighth valve;

a twelfth valve is connected in parallel between a fluid discharge port of the energy output coil pipe of the second heat exchanger and a fluid discharge port of the energy output coil pipe of the first heat exchanger;

a third valve is connected in parallel between a fluid intake port of the high-grade-energy-side heat exchange coil pipe and a fluid discharge port of the energy input coil pipe of the first heat exchanger;

the energy exalting device is composed of a first level heat pump and a second level heat pump connected with each other in series, wherein the first level heat pump comprises a circuit comprised of a first evaporator, a thirteenth valve, a first compressor, a first condenser, a first expansion valve and a fourteenth valve connected in series, and the second level heat pump comprises a circuit composed of a second evaporator, a fifteenth valve, a second compressor, a second condenser, a second expansion valve and a sixteenth valve connected in series;

a first valve is connected in parallel between an output port of the first evaporator and a joint point of the fifteenth valve and the second compressor;

a second valve is connected in parallel between an input port of the first evaporator and a joint point of the sixteenth valve and the second expansion valve; and the first evaporator is coupled with the energy output coil pipe of the first heat exchanger, and the second condenser is coupled with the high-grade-energy-side heat exchange coil pipe.

9. The energy picking-up system by using water of river, lake or sea as low-grade energy source of claim 8, wherein a heating pipe of a water heater is connected in series between the second compressor and the second condenser.

10. The energy picking-up system by using water of river, lake or sea as low-grade energy source of claim 9, wherein:

a heat exchange coil pipe of a cold storage and a ninth valve connected with each other in series are connected in parallel between the fluid return pump and the fifth valve, wherein the heat exchange coil pipe of the cold storage has a fluid intake port connected with a fluid discharge port of the fluid return pump and a fluid discharge port connected with a fluid intake port of the energy output coil pipe of the second heat exchanger via the ninth valve and the sixth valve;

a tenth valve is connected in parallel between the fluid intake port of the heat exchange coil pipe of the cold storage and a fluid discharge port of the ninth valve; and a conduit between the fifth valve and the tenth valve and a conduit between the ninth valve and the sixth valve are connected together by a four-way pipe joint.

* * * * *